United States Patent
Sadasivam et al.

(10) Patent No.: US 10,977,045 B2
(45) Date of Patent: Apr. 13, 2021

(54) PRIORITY INSTRUCTION HANDLING WITH OPTIMIZED ISSUE QUEUE DESIGN

(71) Applicant: International Business Machines Corporation, Armonk, NY (US)

(72) Inventors: Satish Kumar Sadasivam, Erode (IN); Puneeth A. H. Bhat, Bangalore (IN); Shruti Saxena, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/825,144

(22) Filed: Nov. 29, 2017

(65) Prior Publication Data
US 2019/0163487 A1    May 30, 2019

(51) Int. Cl.
*G06F 9/30* (2018.01)
*G06F 9/38* (2018.01)
*G06F 9/22* (2006.01)

(52) U.S. Cl.
CPC .............. *G06F 9/3855* (2013.01); *G06F 9/22* (2013.01); *G06F 9/30145* (2013.01); *G06F 9/3804* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 7,032,101 B2 | 4/2006 | Gschwind | |
| 9,032,188 B2 | 5/2015 | Ozer | |
| 9,928,070 B2 * | 3/2018 | Di .......................... | G06F 9/3814 |
| 10,031,758 B2 * | 7/2018 | Zappulla ................ | G06F 9/3851 |
| 2001/0056456 A1 * | 12/2001 | Cota-Robles ......... | G06F 9/3851 718/103 |
| 2004/0216106 A1 * | 10/2004 | Kalla .................... | G06F 9/3851 718/100 |
| 2015/0106595 A1 | 4/2015 | Khot | |

* cited by examiner

*Primary Examiner* — Corey S Faherty
(74) *Attorney, Agent, or Firm* — David B. Woycechowsky

(57) ABSTRACT

Microprocessor with multiple issue queues in a microprocessor, where at least one of the issue queues is an adjustable mode queue that can be set to act as either of a priority queue, or a regular queue, with respect to intake of new instructions and/or outflow of old instructions. A set of summary bit value(s) can be set to control whether the adjustable mode queue has instruction intake priority and/or instruction outflow priority relative to the other issue queue(s).

15 Claims, 6 Drawing Sheets

PRIORITY INSTRUCTION HANDLING WITH OPTIMIZED ISSUE QUEUE DESIGN

BACKGROUND

The present invention relates generally to the field of handling incoming instructions in microprocessors, and more particularly to using multiple queues for handling incoming instructions in microprocessors.

Microprocessors including more than one instruction issue queue are known. Some known microprocessors store sequences of instructions in a memory for execution by a processor unit. When instructions are fetched, they are decoded and the decoded results stored in one of the issue queues until the instruction is ready to be scheduled—that is, its input operands have been computed and the appropriate functional unit(s) is available. Some known microprocessors: (i) perform instruction classification to identify critical instructions which should be executed early (for example, backward slices of instructions causing performance degrading events); and (ii) store instructions in one issue queue of multiple issue queues (for example, a "regular issue queue" and a "priority issue queue"). These issue queues are associated with different priority levels for execution by the issue logic. Thus, when the issue logic issues instructions in a given cycle, it will give priority to instructions stored in one issue queue over instructions contained in one or more other issue queues. Classification can be based on a variety of criteria, for example: (i) whether an instruction is a speculative prefetch operation; (ii) whether an instruction is part of the dependence graph (backward slice) of an instruction which may cause a performance degrading event, for example, a memory instruction which may miss in the cache, or a branch which may be mispredicted; (iii) whether an instruction is part of the dependence graph (backward slice) of a memory instruction which may miss in the case and which is performance critical; and/or (iv) whether an instruction is a scalar or multimedia-vector (SIMD) instruction.

SUMMARY

According to an aspect of the present invention, a processor includes: an instruction intake module; a plurality of issue queue register sets including a first adjustable mode queue register set and a first regular queue register set; an instruction execution module; and control logic. Each issue queue register set of the plurality of issue queue register sets is structured, connected and/or programmed to temporarily store instructions as instructions are passed from the instruction intake module to the instruction execution module, with the instructions each being characterized by a priority value. The control logic is structured and/or programmed to selectively choose between at least the following two modes of operation: (i) a first mode where the first adjustable queue register set operates at a higher intake and outflow priority than the first regular queue register set, and (ii) a second mode where the first adjustable queue register set operates at equal intake and outflow priority to the first regular queue register set.

According to a further aspect of the present invention, a processor includes: an instruction intake module; a plurality of issue queue register sets including a first adjustable mode queue register set and a first regular queue register set; an instruction execution module; and control logic. Each issue queue register set of the plurality of issue queue register sets is structured, connected and/or programmed to temporarily store instructions as instructions are passed from the instruction intake module to the instruction execution module, with the instructions each being characterized by a priority value. The control logic is structured and/or programmed to selectively choose between at least the following two modes of operation: (i) a first mode where the first adjustable queue register set operates at a higher intake priority than the first regular queue register set, and (ii) a second mode where the first adjustable queue register set operates at equal intake priority to the first regular queue register set.

According to a further aspect of the present invention, a processor includes: an instruction intake module; a plurality of issue queue register sets including a first adjustable mode queue register set and a first regular queue register set; an instruction execution module; and control logic. Each issue queue register set of the plurality of issue queue register sets is structured, connected and/or programmed to temporarily store instructions as instructions are passed from the instruction intake module to the instruction execution module, with the instructions each being characterized by a priority value. The control logic is structured and/or programmed to selectively choose between at least the following two modes of operation: (i) a first mode where the first adjustable queue register set operates at a higher outflow priority than the first regular queue register set, and (ii) a second mode where the first adjustable queue register set operates at equal outflow priority to the first regular queue register set.

DETAILED DESCRIPTION

Figure 1:
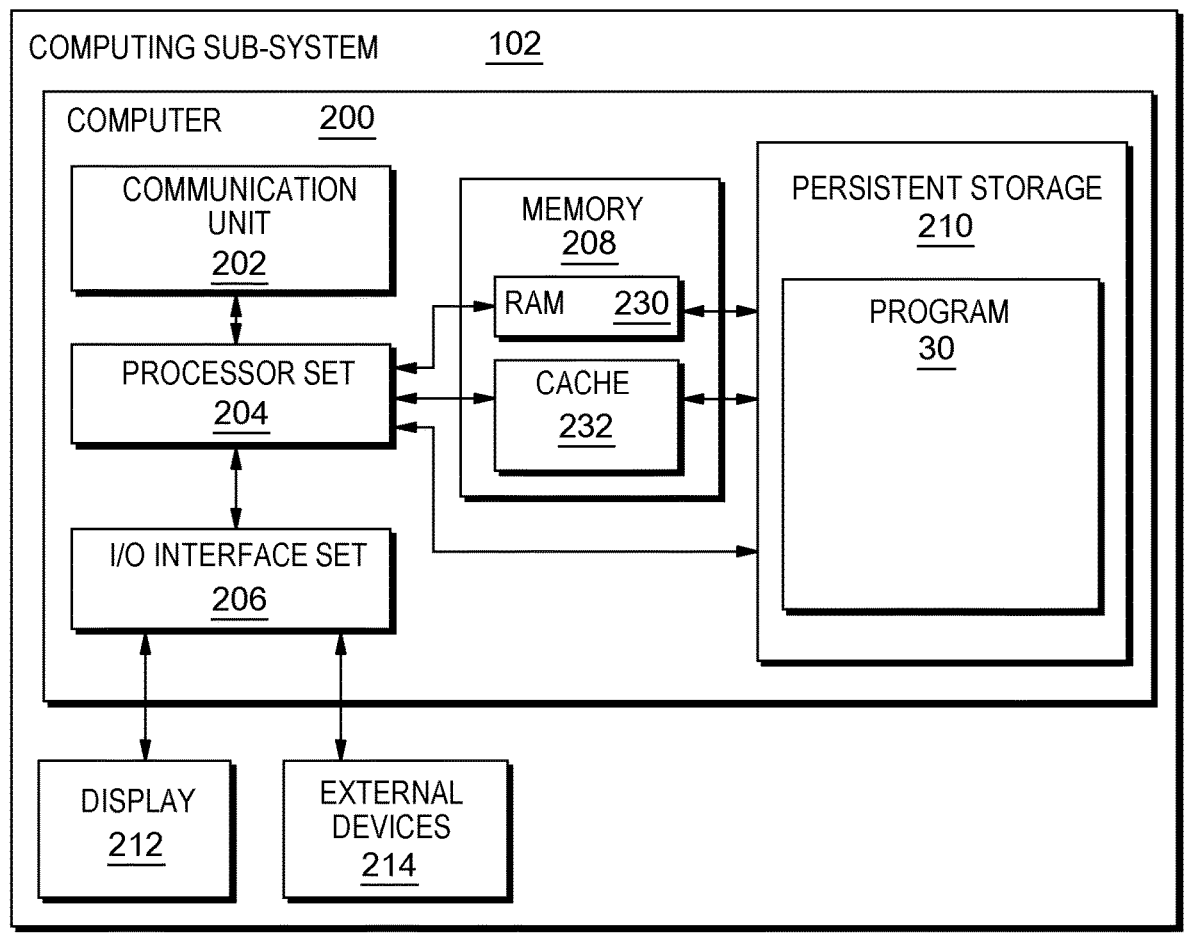
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of computing system 102, including: computer 200; communication unit 202; processor set 204; input/output (I/O) interface set 206; memory device 208; persistent storage device 210; display device 212; external device set 214; random access memory (RAM) devices 230; cache memory device 232; and program 30.

Several portions of system 102 will now be discussed in the following paragraphs.

System 102 may be a laptop computer, tablet computer, netbook computer, personal computer (PC), a desktop computer, a personal digital assistant (PDA), a smart phone, or any programmable electronic device capable of communicating with the client sub-systems via network(s). Program 30 is a collection of machine readable instructions and/or data that is used to create, manage and control certain software functions that will be discussed in detail, below, in the Example Embodiment sub-section of this Detailed Description section. System 102 is capable of communicating with other computer sub-systems via communication network(s).

System 102 is shown as a block diagram with many double arrows. These double arrows (no separate reference numerals) represent a communications fabric, which provides communications between various components of system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for system 102; and/or (ii) devices external to system 102 may be able to provide memory for system 102.

Program 30 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 30 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 30, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
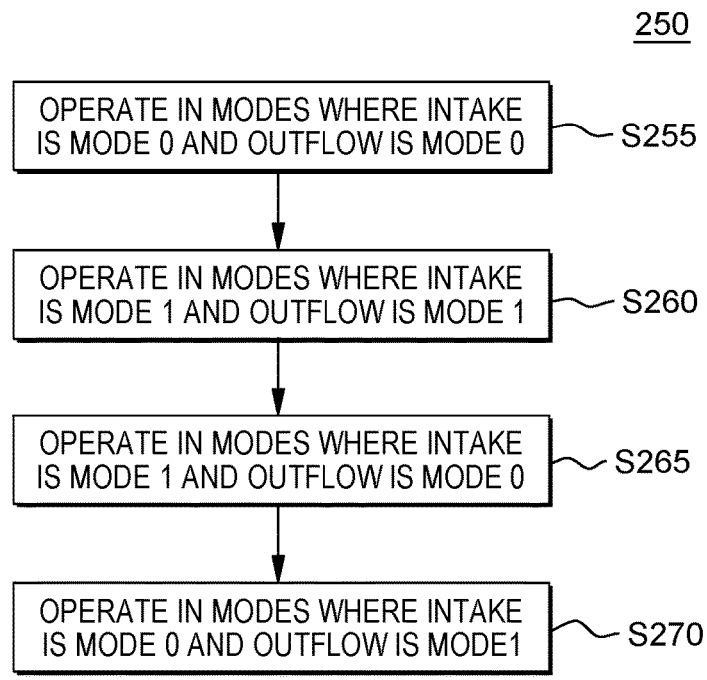
FIG. 2 is a flowchart showing a first embodiment method performed, at least in part, by the first embodiment system.
Figure 3:
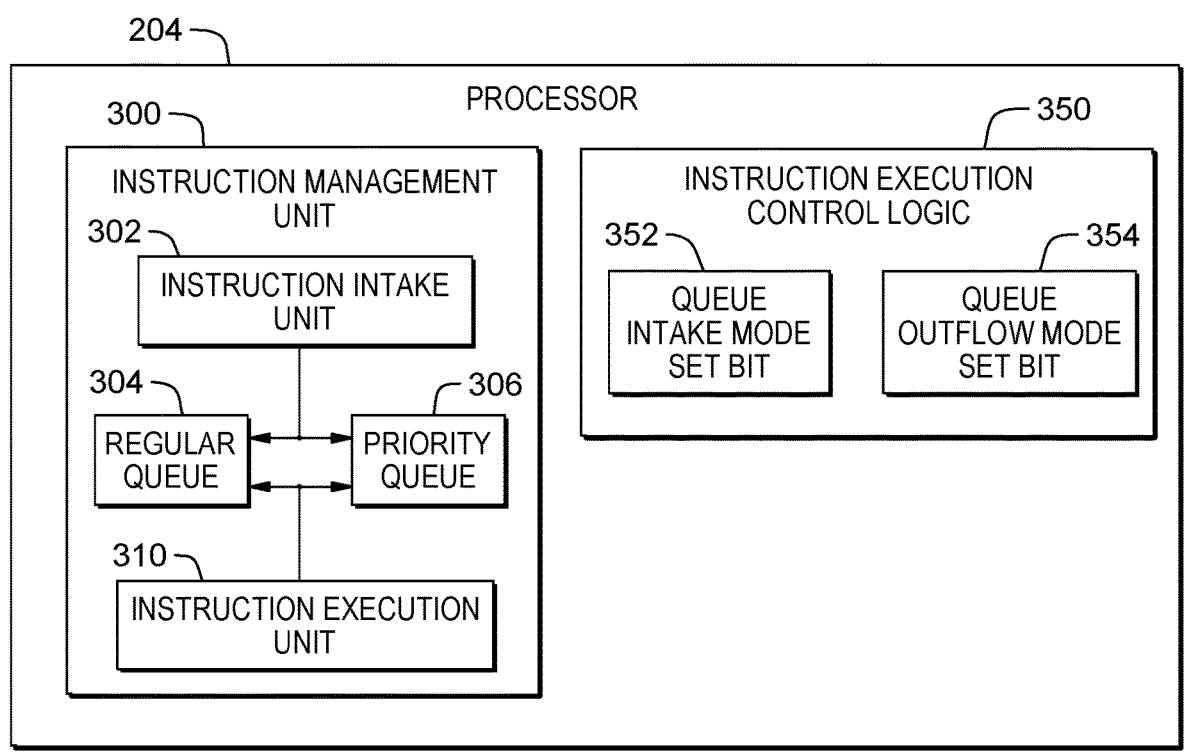
FIG. 3 is a block diagram showing a processor portion of the first embodiment system.
Figure 4:
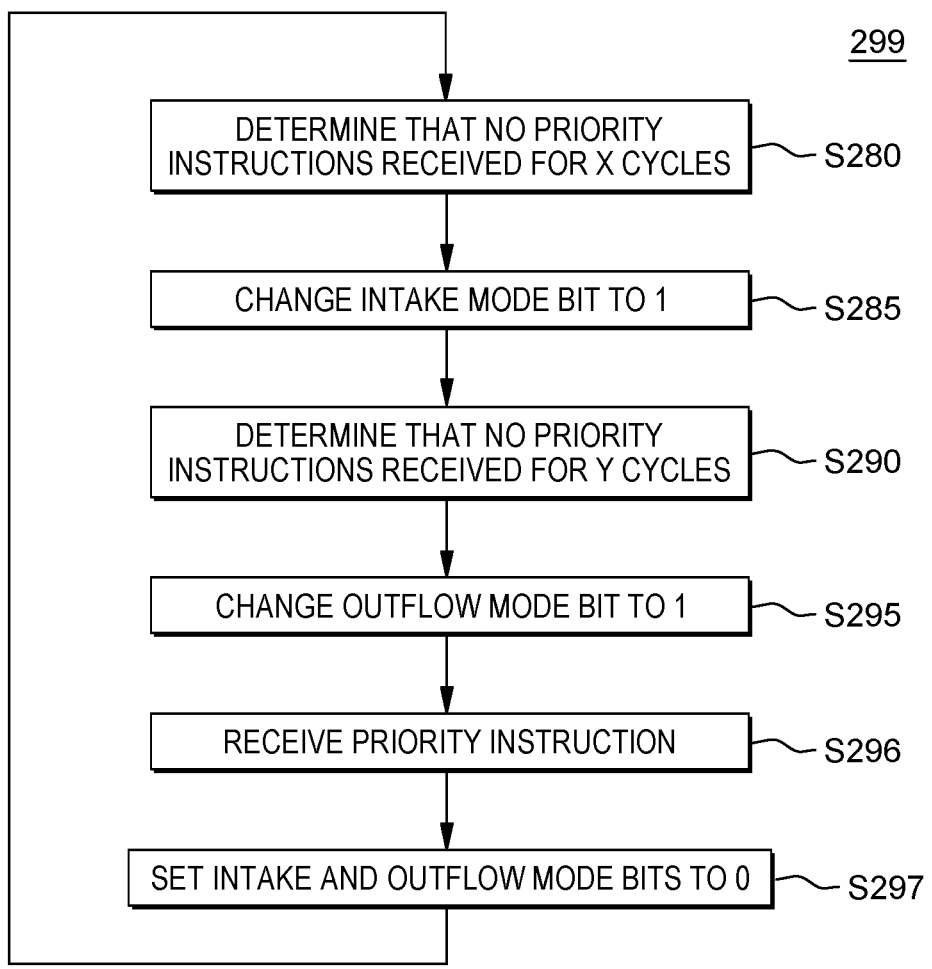
FIG. 4 is a flowchart showing a first embodiment method performed, at least in part, by the first embodiment system.

FIGS. 2 and 4 respectively show flowchart 250 and 299 depicting methods according to the present invention. FIG. 3 shows processor 204 which performs the operations of flowcharts 250 and 299. This method and associated software will now be discussed, over the course of the following paragraphs, with extensive reference to FIGS. 2 and 4 (for the method operation blocks) and FIG. 3 (which is a block diagram of processor 204).

Processing begins at operation S255, where: (i) queue intake mode set bit 352 of instruction execution control logic 350 of processor 204 is given a 0 value; (ii) queue outflow mode set bit 354 of instruction execution control logic 350 of processor 204 is given a 0 value; and (iii) instruction execution register set 310 of processor 204 receives instructions through instruction intake register set 302, regular queue (also sometimes herein referred to as regular issue queue) 304 and priority queue (also sometimes herein referred to as priority issue queue) 306 in a 00 mode.

In this embodiment of FIGS. 1 to 4, the priority queue can be adjusted independently with respect of both of its intake priority and its outtake priority. While this embodiment may be within the scope of the invention, it is not necessarily preferred. Alternatively, in some embodiments, Intake and outflow of the priority queue are adjusted together. In these embodiments, there are not four (4) different combinations because the intake is exclusively controlled by the arriving instruction and its priority bit and the OR value (summary bit) of all priority bit in the priority queue. In these embodiments (which will be further discussed in the following sub-section of this Detailed Description section): (i) instructions with Priority bit ON will always enter the priority queue; (ii) if none of the instructions in priority issue queue has priority bit set (the summary bit, that is, OR value of all the priority bits are 0) then regular non-prioritized instructions are allowed to enter both queue in a balanced manner (alternating or block of instructions to each queue); (iii) when the first priority instruction enters the queue the summary bit will automatically become 1 because of the OR logic; and (iv) IF summary bit is '1' then only priority instructions are allowed to enter the priority queue until the regular queue is full; (v) if regular queue is full for optimization reasons regular instructions may, in some embodiments, be allowed to enter the priority issue queue; (vi) outflow will also be prioritized based on the summary bit to give priority for instructions in prioritized issue queue to get executed first; and (vii) if no instructions are ready then instructions from regular queue will go for execution.

Moving discussion back to the four mode embodiment of FIGS. 1 to 4, in this embodiment, operation in a 00 mode means that both regular queue 304 and priority queue 306: (i) receive instructions in from instruction intake unit 302 of instruction management unit 300 in an alternating fashion; and (ii) output instructions to instruction execution register set 310 in an alternating fashion. More specifically, the queues 304, 306 receive instructions in an alternating fashion, without either queue having a higher intake priority, because queue intake mode set bit 352 is set to 0. The queues 304, 306 output instructions in an alternating fashion, without either queue having a higher outflow priority, because queue outflow mode set bit 354 is set to 0.

While this embodiment maintains equal intake and outflow priority, as between queues 304 and 306, by alternating both of these queues with respect to instruction intake and outflow, there are alternative ways in maintaining equal priority between these two queues. For example, intake and/or out flow could be based on a scheme that alternates queues for every set of five (5) consecutive instructions. As a further example, queue intake and/or outflow could be based upon which queue has more instructions in it (which would only alternate intake and/or outflow when the queues have approximately equal numbers of instructions).

While this example has only two queues, there could be additional queues (which may or may not vary in priority relative to regular issue queue 304). While this example has instructions that have only two possible priority level values (low or high), there could be additional possible priority level values for instructions.

Processing proceeds to operation S260, where: (i) queue intake mode set bit 352 of instruction execution control logic 350 of processor 204 is given a 1 value; (ii) queue outflow mode set bit 354 of instruction execution control logic 350 of processor 204 is given a 1 value; and (iii) instruction execution register set 310 of processor 204 receives instructions through instruction intake unit 302, regular queue (also sometimes herein referred to as regular issue queue) 304 and priority queue (also sometimes herein referred to as priority issue queue) 306 in a 11 mode.

In this embodiment, operation in an 11 mode means that: (i) regular queue 304 receives only low priority instructions from instruction intake unit 302; (ii) priority queue 306 receives only high priority instructions from instruction intake unit 302; and (iii) priority queue 306 has outflow priority than regular queue 304. Because priority queue 306 now has priority over regular queue 304, this means that that regular queue 304 will only output instructions when priority queue is empty. In 11 mode, the queues 304 306 receive instructions based on instruction priority (with priority queue 306 having a higher intake priority) because queue intake mode set bit 352 is set to 1. In 11 mode, the priority issue queue 306 has outflow priority, relative to regular issue queue 304, because queue outflow mode set bit 354 is set to 1.

Processing proceeds to operation S265, where: (i) queue intake mode set bit 352 of instruction execution control logic 350 of processor 204 maintains its 1 value; (ii) queue outflow mode set bit 354 of instruction execution control logic 350 of processor 204 is given a 0 value; and (iii) instruction execution register set 310 of processor 204 receives instructions through instruction intake unit 302, regular queue (also sometimes herein referred to as regular issue queue) 304 and priority queue (also sometimes herein referred to as priority issue queue) 306 in a 10 mode.

In this embodiment, operation in a 10 mode means that: (i) regular queue 304 receives only low priority instructions from instruction intake unit 302; (ii) priority queue 306 receives only high priority instructions from instruction intake unit 302; and (iii) output instructions to instruction execution unit 310 in an alternating fashion. More specifically, the queues 304 306 receive instructions based on instruction priority (with priority queue 306 having a higher intake priority) because queue intake mode set bit 352 is set to 1. The queues 304, 306 still output instructions in an alternating fashion, without either queue having a higher outflow priority, because queue outflow mode set bit 354 is set to 0. Alternatively, in some embodiments, and as will be discussed in detail in the next sub-section of this Detailed Description section, the intake and outflow priority of priority queue 306 can be set in a unified manner with a single bit.

Processing proceeds to operation S270, where: (i) queue intake mode set bit 352 of instruction execution control logic 350 of processor 204 is given a 0 value; (ii) queue outflow mode set bit 354 of instruction execution control logic 350 of processor 204 is given a 1 value; and (iii) instruction execution unit 310 of processor 204 receives instructions through instruction intake unit 302, regular queue (also sometimes herein referred to as regular issue queue) 304 and priority queue (also sometimes herein referred to as priority issue queue) 306 in a 01 mode.

In this embodiment, operation in a 01 mode means that: (i) both regular queue 304 and priority queue 306 receive instructions from instruction intake unit 302 in an alternating fashion; and (ii) priority queue 306 has outflow priority than regular queue 304.

Now that all four (4) possible modes of operation of processor 204 have been discussed, discussion will proceed to FIG. 4, to explain how instruction execution control logic 350 of processor 204 determines which mode to use during its operations.

Processing begins at operation S280, where: (i) it is determined that no high priority instructions have been received for X processing cycles (where X is a predetermined threshold); and (ii) in response, the operating mode is set to 00 (meaning that queues 304 and 306 are used with equal intake and outflow priority). As will be discussed in the next sub-section of this Detailed Description section, there are other ways of determining when to operate the queues at equal priority, and when to operate the priority queue at a higher intake/outflow priority level.

Processing proceeds to operation S285, where: (i) a high priority instruction is received through one of queues 304, 306 by instruction execution unit 310; and (ii) in response, the operating mode is set to 10 (meaning that queue 306 will now receive only high priority instructions on a going-forward basis). Alternatively, there are other ways of determining that the priority queue is to be given a higher intake priority, as will be further discussed in the following sub-section of this Detailed Description section.

Processing proceeds to operation S290, where it is determined that priority issue queue 306 has more than Y instructions in it, waiting to be executed (where Y is a predetermined threshold). In response, at S295, the operating mode is set to 11 (meaning that queue 304 will, on a going-forward basis, only output instructions to instruction execution unit 310 when queue 306 is empty). Alternatively, there are other ways of determining that the priority queue is to be given a higher outflow priority, as will be further discussed in the following sub-section of this Detailed Description section. In this embodiment, operations proceed in this manner until a priority instruction is received (at operation S296), and, in response, operating mode is set back to 00 (at operation S297).

From operation S297, processing loops back to S280, where operations proceed in 00 mode, with a regular queue for regular instructions and a priority queue for priority instructions.

III. Further Comments and/or Embodiments

Some embodiments of the present invention recognize the following facts, potential problems and/or potential areas for improvement with respect to the current state of the art: (i) a drawback of some currently conventional microprocessors is that when there are no priority instructions available in the stream the priority issue queue will remain unutilized; and (ii) a drawback of some currently conventional microprocessors is that when there are no priority instructions available in the stream the priority issue queue will remain unused.

Some embodiments of the present invention may include one, or more, of the following features, characteristics and/or advantages: (i) microprocessor design that allows the usage of both the unified issue queue and the priority issue queue equally when there are no priority instructions available for execution; (ii) once the priority instructions start to appear in a stream, then the instructions are sent to the priority issue queue; (iii) the issue logic starts issuing instructions ready for execution in the priority issue queue at high priority; (iv) when there are no instructions available in the priority issue queue, instructions in the regular unified issue queue are picked for execution; (v) after the first priority instructions enter the priority issue queue, the priority issue queue will not accept any regular non-prioritized instructions; and/or (vi) after the first priority instructions enter the priority issue queue, the existing non-prioritized instructions in the issue queue will execute at high priority until the issue queue drains to a point such that it reaches the priority instructions for execution.

A method according to the present invention includes the following operations: (i) instructions from an icache (that is, instruction cache) are moved to the instruction fetch buffer for decode and dispatch; (ii) instructions are dispatched and after completing the register mapping gets into the issue queue; (iii) priority determination logic determines whether the instruction is regular or prioritized instructions as follows: (a) if Summary bit=1 unified issue queue takes all the normal priority instructions and the priority instructions are loaded into the Priority Issue Queue, and (b) if Summary bit=0 instructions are issued to both issue queues with equal priority; (iv) instructions are issued from Priority issue queue to the execution unit based on the following rule: (a) if the Summary bit=0 Instructions are issued at equal priority from both the issue queues, and (b) if the Summary bit=1 Instructions waiting in the PrioQ are always given the first priority to execute; and (v) if no instructions are ready for issue in the PrioQ, instructions from regular Unified issue queue is selected for execution.

Figure 5:
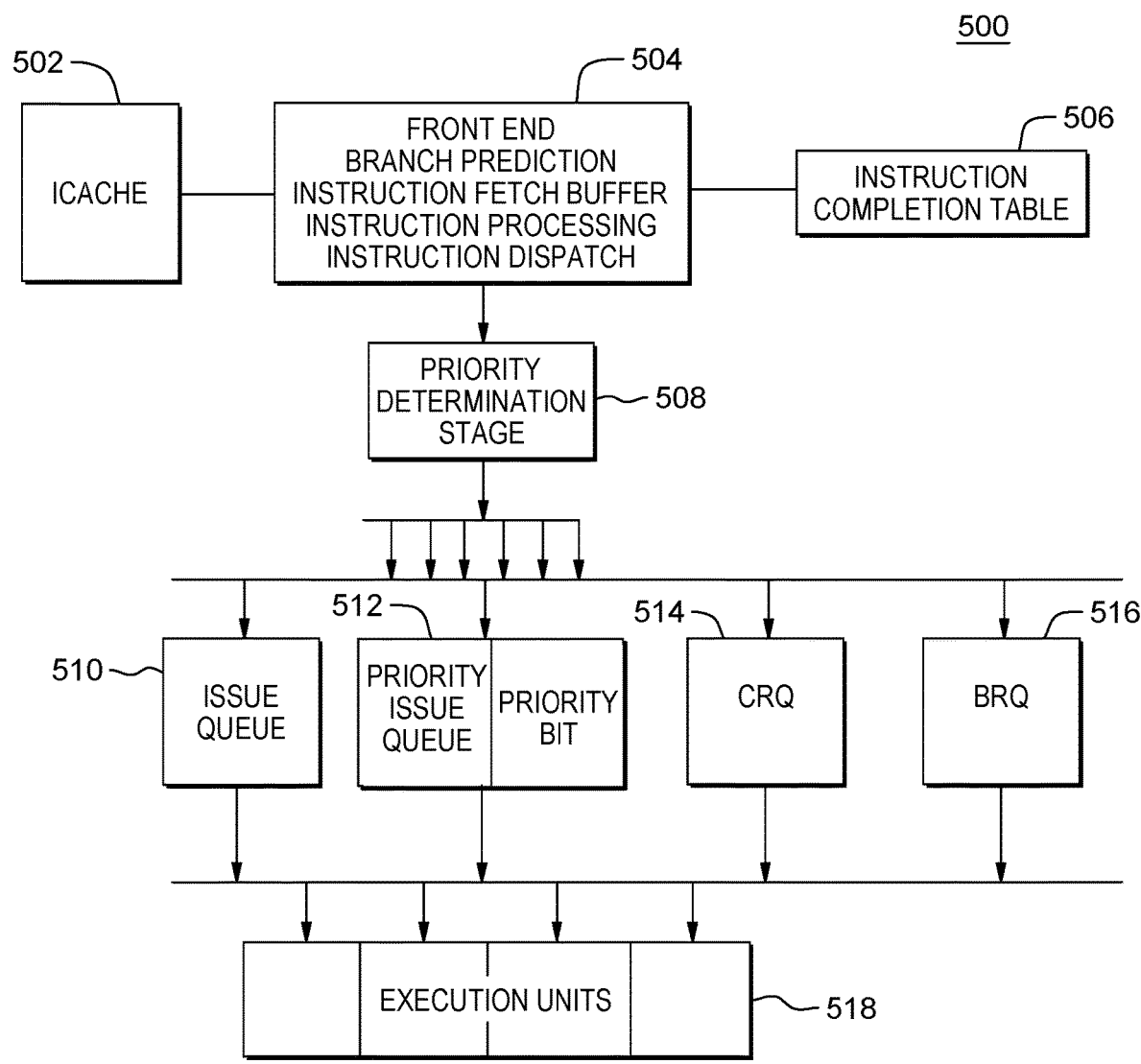
FIG. 5 is a block diagram of a second embodiment of a system according to the present invention.

As shown in FIG. 5, microprocessor 500 includes icache 502; front end branch prediction instruction fetch buffer 504; instruction completion table 506; priority determination stage 508; issue queue (also sometimes referred to as "unified issue queue") 510; priority issue queue 512; CRQ (condition register queue) 514; BRQ (branch register queue) 516; and execution units 518. The structure and/or control logic firmware and/or software of microprocessor 500 (not separately shown) case the flow of instructions through the microprocessor as shown by the arrows of FIG. 5. FIG. 5 shows a technique to utilize priority issue queue 512 to handle non-prioritized instructions when there are no priority instructions detected in the stream. Non-priority instructions are allowed to enter the priority issue queue only when the priority queue has no priority instructions, and equal priority is given to issue instructions to execution unit from both issue queue (that is, priority bit=0).

Operations of microprocessor 500 will now be set forth in detail: (i) instructions from the icache are moved to the Instruction fetch buffer for decode and dispatch; (ii) instructions are dispatched and after completing the register mapping gets into the issue queue; (iii) priority determination logic (not separately shown in FIG. 5) determines whether the instruction is a regular instruction or, alternatively, a prioritized instruction; (iv) if the priority bit=1, then unified issue queue takes all the normal priority instructions and the priority instructions are loaded into the Priority Issue Queue, (v) if priority bit=0 instructions are issued to both issue queues equally (vi) instructions are issued from the priority issue queue to execution units 518 based on the following rules: (a) if the priority bit=0, then instructions are issued at equal priority from both the issue queue and the priority issue queue, and (b) if the priority bit=1, then instructions waiting in priority issue queue 512 are always given the first priority to execute; and (vii) if no instructions are ready for issue in the priority issue queue, then instructions from regular unified issue queue 510 are selected for execution.

Some embodiments of the present invention recognize the following facts, potential problems and/or potential areas for improvement with respect to the current state of the art: (i) on determining/identifying if there are no priority instructions in the system, loading the priority issue queue with the non-prioritized instructions; (ii) once the prioritized instruction enters the priority issue queue, the priority issue queue will not accept any other non-prioritized instructions and executing the already existing (in the priority issue queue) non-prioritized instructions at high priority till it drains to reach the priority instruction for execution; (iii) deals with the microarchitecture unit where the instructions which are coming from any number of threads and stored in a queue; (iv) from the queue referred to in the preceding item in this list, the instructions move to the execution unit for execution once the instruction is ready in an out-of-order fashion; (v) at this stage is there is no differentiation between instructions from different threads waiting for execution; (vi) monitors priority instruction which are set for that instruction irrespective of whichever thread it is arriving from; (vii) deals with handling and reuse of priority issue queue for non-prioritized instructions in the microprocessor; (viii) provides a solution to a challenge encountered in currently conventional microprocessors relating to reusing or utilizing the higher priority issue queue to store lower priority instructions; and (ix) deals with the logic to make the queue function in an effective manner for reusing and reutilizing the higher priority issue queue for lower or no-priority instructions.

Summary bit is calculated by doing logic 'OR' of all priority bits in the priority issue queue. Once the summary bit is set to 1, only priority instructions will be allowed to enter the priority issue queue. This can be seen by comparing process 600a of FIG. 6A (where priority bit is 0) to process 600b of FIG. 6B (where priority bit is set to 1). This is to ensure the easy implementation of issue queue logic. This is potentially helpful in the server design space. Some embodiments of the present invention may help optimize the processor design for high performance microprocessors.

Figure 6A:
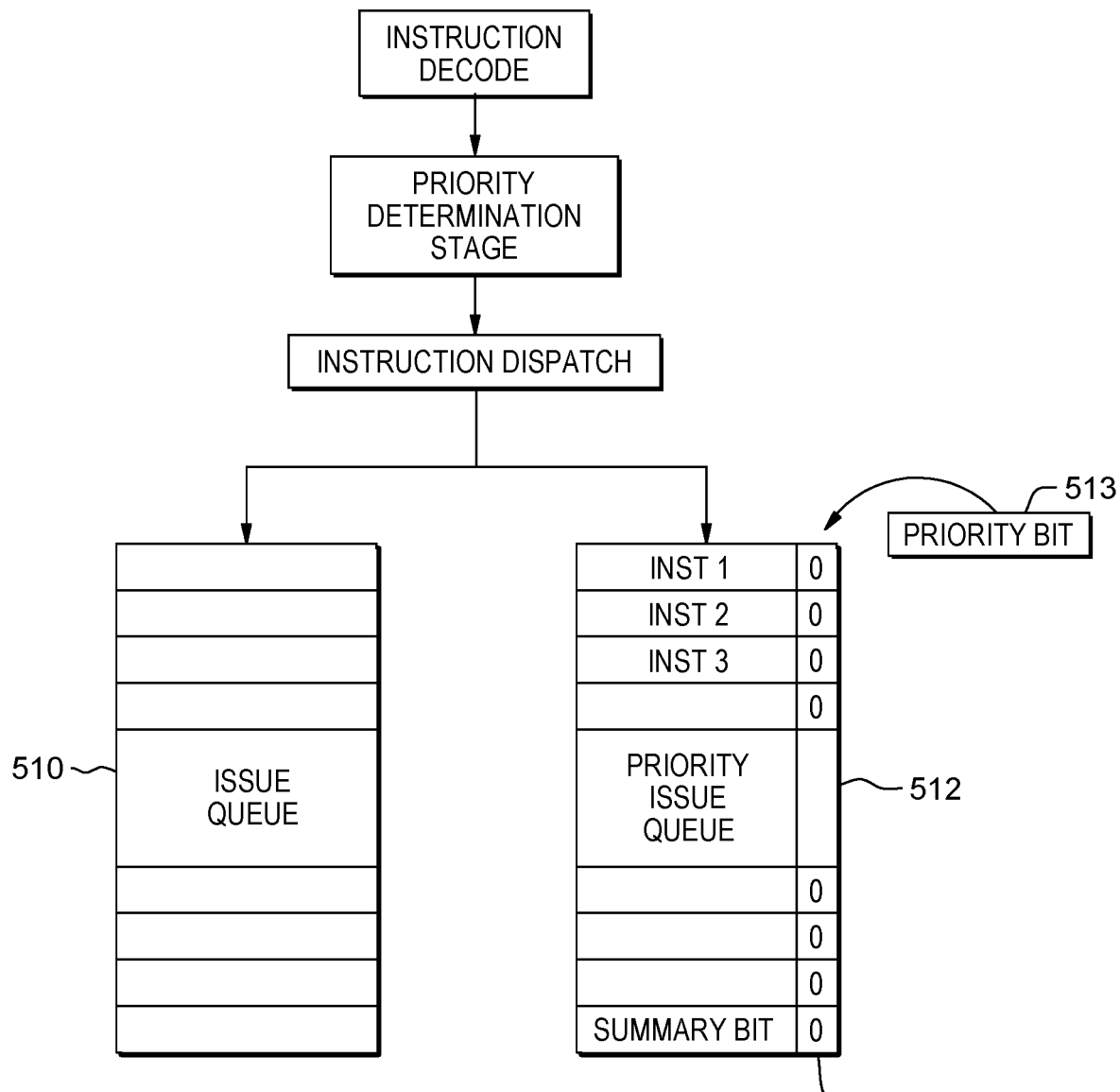
FIG. 6A is a flow diagram showing operations performed according to an embodiment of the present invention.
Figure 6B:
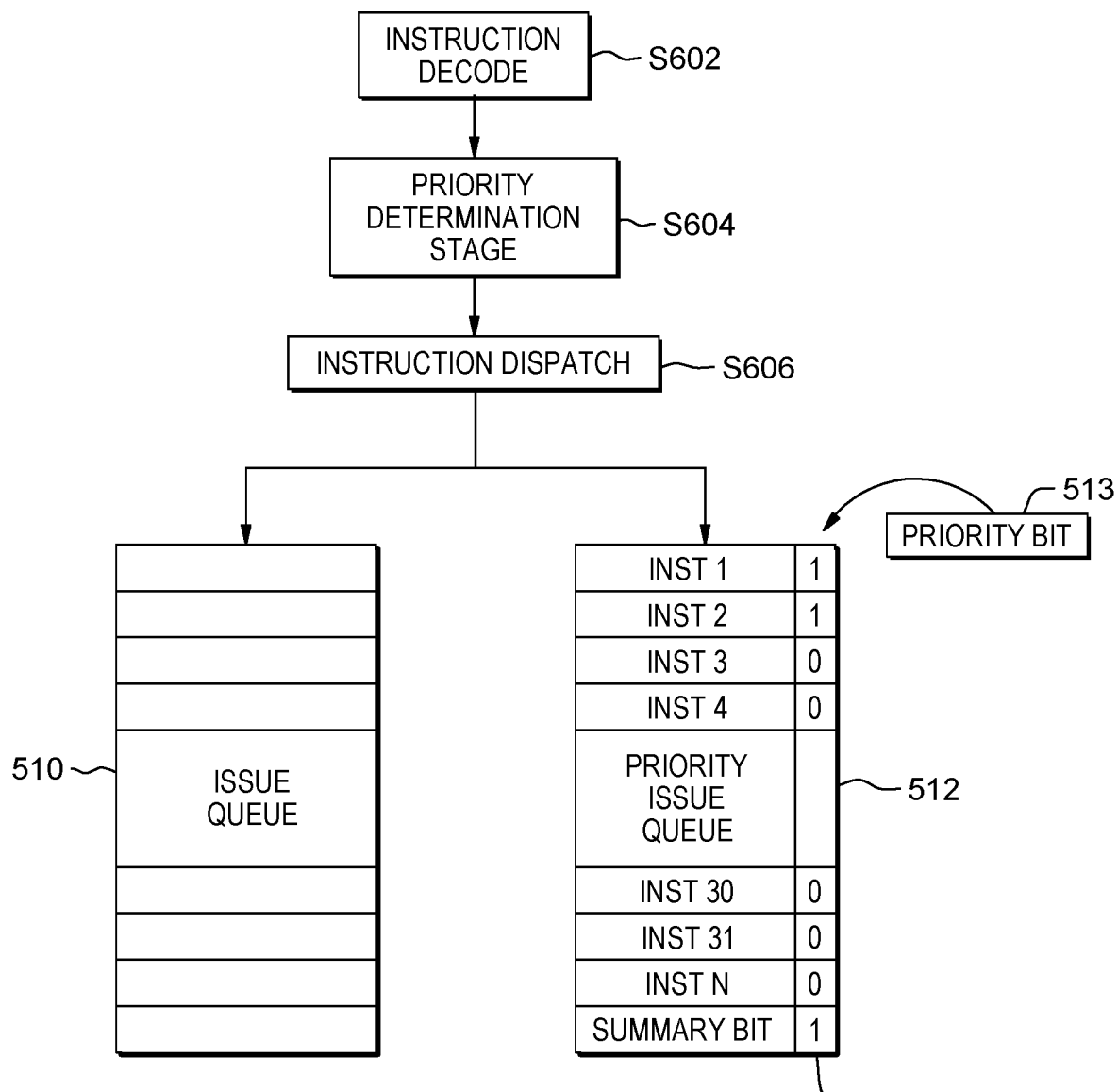
FIG. 6B is a flow diagram showing operations performed according to an embodiment of the present invention.

FIG. 6A shows the flow of instructions into issue queues when summary bit 515 is set to 0 (that is, regular mode) so that the priority issue queue will accept low priority instructions (that is, where the associated priority bit 513 is 0). FIG. 6B (including operations S602, S604 and S606) shows the flow of instructions into issue queues when summary bit 515 is set to 1 (that is, priority mode) so that the priority issue queue will only accept new high priority instructions (that is, where the associated priority bit 513 is 1).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Register set: any set of registers in a processor.

What is claimed is:

1. A processor comprising:
an instruction intake module;
a plurality of issue queue register sets including a first adjustable mode queue register set and a first regular queue register set;
an instruction execution module; and
control logic;
wherein:
each issue queue register set of the plurality of issue queue register sets is structured, connected and/or programmed to temporarily store instructions as instructions are passed from the instruction intake module to the instruction execution module, with the instructions each being characterized by a priority value; and
the control logic is structured and/or programmed to selectively choose between at least the following two modes of operation: (i) a first mode where the first adjustable queue register set operates at a higher outflow priority than the first regular queue register set, and (ii) a second mode where the first adjustable queue register set operates at equal outflow priority to the first regular queue register set;
wherein the control logic is further structured and/or programmed to perform a logical OR operation on respective priority bit values of all instructions in the first adjustable queue register set;
wherein the control logic is further structured and/or programmed to choose the first mode when the performance of the logical OR operation yields a 1; and
wherein the control logic is further structured and/or programmed to choose the second mode when the performance of the logical OR operation yields a 0.

2. The processor of claim 1 wherein the processor is a microprocessor.

3. A computer implemented method (CIM) for use with a set of microprocessor(s) that execute instructions from a plurality of issue queues including a first priority issue queue and a first unified issue queue, the method comprising:
determining that there are no priority instructions in an instruction stream of instruction(s) available for execution;
responsive to the determination that there are no priority instructions available for execution, using queues of the plurality of queues equally when performing instructions by the set of microprocessor(s);
while using both of the queues of the plurality of queues equally, determining that priority instruction(s) have started to appear in the instruction stream;
responsive to the determination that priority instruction(s) have started to appear in the instruction stream:
sending the priority instruction(s) to the priority issue queue,
issuing, by issue logic, instructions ready for execution in the priority issue queue at high priority, and
declining, by the first priority queue, to accept any regular non-prioritized instructions from the instruction stream;
subsequent to issuing instructions ready for execution in the priority issue queue at high priority, determining that there are no longer any instructions available in the priority issue queue; and
responsive to the determination that there are no longer any instructions available in the priority issue queue, executing instructions in the first unified issue queue.

4. The CIM of claim 3 further comprising:
subsequent to sending the priority instruction(s) to the priority issue queue, executing existing non-prioritized instructions in the first priority issue queue at high priority until the first priority issue queue drains to a point such that it reaches priority instructions for execution.

5. The CIM of claim 3 further comprising:
moving instructions from an instruction cache to an instruction fetch buffer for decode and dispatch.

6. The CIM of 5 further comprising:
completing a register mapping; and
subsequent to completing the register mapping, dispatching instructions to the plurality of issue queues with the dispatching including applying priority determination logic to determine whether the dispatched instructions respectively are regular or prioritized instructions.

7. The CIM of claim 6 wherein the set of issue queues includes only the first unified issue queue and the first priority issue queue.

8. The CIM of claim 3 wherein the set of issue queues includes only the first unified issue queue and the first priority issue queue.

9. A computer program product (CPP) for use with a set of microprocessor(s) that execute instructions from a plurality of issue queues including a first priority issue queue and a first unified issue queue, the CPP comprising:
a set of storage device(s), with each storage device of the set of storage device(s) including a set of storage medium(s); and
computer code stored on the set of storage device(s), with the computer code including instructions and data for causing a processor(s) set to perform at least the following operations:
determining that there are no priority instructions in an instruction stream of instruction(s) available for execution,
responsive to the determination that there are no priority instructions available for execution, using queues of the plurality of queues equally when performing instructions by the set of microprocessor(s),
while using both of the queues of the plurality of queues equally, determining that priority instruction(s) have started to appear in the instruction stream,
responsive to the determination that priority instruction(s) have started to appear in the instruction stream:
sending the priority instruction(s) to the priority issue queue,
issuing, by issue logic, instructions ready for execution in the priority issue queue at high priority, and
declining, by the first priority queue, to accept any regular non-prioritized instructions from the instruction stream,
subsequent to issuing instructions ready for execution in the priority issue queue at high priority, determining that there are no longer any instructions available in the priority issue queue, and
responsive to the determination that there are no longer any instructions available in the priority issue queue, executing instructions in the first unified issue queue.

10. The CPP of claim 9 wherein the computer code further includes instructions and data for causing the processor(s) set to perform the following operation(s):
subsequent to sending the priority instruction(s) to the priority issue queue, executing existing non-prioritized instructions in the first priority issue queue at high priority until the first priority issue queue drains to a point such that it reaches priority instructions for execution.

11. The CPP of claim 9 wherein the computer code further includes instructions and data for causing the processor(s) set to perform the following operation(s):
moving instructions from an instruction cache to an instruction fetch buffer for decode and dispatch.

12. The CPP of 11 wherein the computer code further includes instructions and data for causing the processor(s) set to perform the following operation(s):
completing a register mapping; and
subsequent to completing the register mapping, dispatching instructions to the plurality of issue queues with the dispatching including applying priority determination logic to determine whether the dispatched instructions respectively are regular or prioritized instructions.

13. The CPP of claim 12 wherein the set of issue queues includes only the first unified issue queue and the first priority issue queue.

14. The CPP of claim 9 wherein the set of issue queues includes only the first unified issue queue and the first priority issue queue.

15. The CPP of claim 9 wherein the CPP is in the form of a computer system (CS), with the CPP further comprising the processor(s) set.

* * * * *